United States Patent
Choi et al.

(10) Patent No.: US 7,682,059 B2
(45) Date of Patent: Mar. 23, 2010

(54) DIRECT TYPE BACK LIGHT

(75) Inventors: Jong Hyun Choi, Icheon-Kwangyokshi (KR); Dae San Lim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 48 days.

(21) Appl. No.: 11/320,766

(22) Filed: Dec. 30, 2005

(65) Prior Publication Data
US 2006/0187672 A1    Aug. 24, 2006

(30) Foreign Application Priority Data
Feb. 18, 2005    (KR)    .................... 10-2005-0013637

(51) Int. Cl.
*F21B 8/00*    (2006.01)
(52) U.S. Cl. ...................................... 362/560; 362/561
(58) Field of Classification Search ................. 362/560, 362/561, 558, 511, 330; 349/61, 62, 64, 349/67
See application file for complete search history.

(56) References Cited

U.S. PATENT DOCUMENTS

| | | | | |
|---|---|---|---|---|
| 7,229,193 B2 * | 6/2007 | Jeon | ............................ | 362/225 |
| 2004/1025779 | * 12/2004 | Wakabayashi | ................ | 362/31 |
| 2005/0063172 A1 * | 3/2005 | Torihara | ....................... | 362/31 |

FOREIGN PATENT DOCUMENTS

CN    1573463 A    2/2005

* cited by examiner

*Primary Examiner*—Sharon E Payne
(74) *Attorney, Agent, or Firm*—Birch, Stewart, Kolasch & Birch LLP

(57) ABSTRACT

A direct type back light includes a case holding a plurality of lamps. The lamps may be "U" shaped and have curves arranged at a centerline of the case to face each other with a gap there between. A reflecting plate is positioned below the plurality of lamps. A luminance control sheet is provided above the reflecting plate and below the lamps in several of, or all of, the gaps. The luminance control sheet may have a lower reflectivity or a higher reflectivity than the reflecting plate to remove a bright line or a dark line in the center of the display, respectively.

18 Claims, 6 Drawing Sheets

US 7,682,059 B2

DIRECT TYPE BACK LIGHT

This application claims the benefit of the Korean Patent Application No. 10-2005-0013637, filed on Feb. 18, 2005, which is hereby incorporated by reference as if fully set forth herein.

BACKGROUND OF THE INVENTION

1. Field of the Invention

The present invention relates to a back light for a liquid crystal display (LCD) device, and more particularly, to a direct type back light in which U shaped lamps for divisional driving are used. More particularly, the present invention relates to removing a bright line or a dark line occurring in a juncture area between the lamps to obtain back light uniformity.

2. Discussion of the Related Art

Recently, flat panel displays have been studied actively. Among them, an LCD device, a field emission display (FED) device, an electro-luminescence display (ELD) device, a plasma display panel (PDP) have received much attention.

It is a general tendency that the LCD device is widely used in the field of notebook PCs, desktop monitors, and liquid crystal TVs owing to its advantages of high contrast ratio, features suitable for displaying gradation or moving pictures, and low power consumption.

However, since the LCD device is a nonradiative device, an outer light source is separately required to irradiate light. Particularly, a transmission type LCD device essentially requires a separate irradiating device, i.e., a back light that emits and guides light on a rear surface of an LCD panel.

The back light may be classified into an edge type back light and a direct type back light depending on how light is transmitted.

The edge type back light includes a tube type linear light source such as a light-emitting lamp (hot cathode and cold cathode) provided on a side of an LCD panel. This edge type back light transmits light from the light-emitting lamp to an entire surface of the LCD panel using a transparent light guide panel.

The direct type back light includes a light-emitting lamp selectively provided below an LCD panel, and a diffusion sheet provided between the light-emitting lamp and the LCD panel. This direct type back light uniformly distributes light from the light-emitting lamp on an entire surface of the LCD panel after diffusing the light using the diffusion sheet.

Since the direct type back light does not require a light guide panel, it can provide a slim and lightweight size, high luminance and uniform light distribution.

Hereinafter, a related art direct type back light will be described with reference to the accompanying drawings.

FIG. 1 is a perspective view illustrating a related art direct type back light, FIG. 2 is a plane view illustrating another related art direct type back light, FIG. 3 is a sectional view taken along line I-I' of FIG. 2, and FIG. 4 is a photograph illustrating problems of the related art direct type back lights.

First, an LCD device based on a back light will be described.

Generally, the LCD device includes an LCD panel, a polarizing plate, a direct type back light, a case, and a bezel. The LCD panel includes a liquid crystal layer, and upper and lower substrates bonded to each other by interposing the liquid crystal layer therebetween. The polarizing plate is respectively provided on upper and lower surfaces of the LCD panel to transmit only light in one direction. The direct type back light is provided a slight distance from the LCD panel to provide light to the LCD panel. The case surrounds an outer side of the direct type back light to support the LCD panel and the direct type back light. The bezel is provided outside the case to surround a corner except an effective area for displaying images. The bezel is made of a stainless steel material.

In FIG. 1, the direct type back light employs cold cathode fluorescent lamps (CCFL) and includes a plurality of light-emitting lamps 111, an outer case 103, and optical sheets. The light-emitting lamps 111 are fitted into grooves formed at both sides of the outer case 103. The outer case 103 fixes and supports the light-emitting lamps 111. The optical sheets are arranged between the light-emitting lamps 111 and an LCD panel (not shown), and include a diffusion sheet 115, a prism sheet 116 and a protective sheet 117.

The optical sheets prevent outlines of the light-emitting lamps from being displayed on a display surface of the LCD panel and provide a light source having uniform brightness distribution. The sheets are arranged to improve a light dispersion effect.

A reflecting plate is arranged below the light-emitting lamps 111 to focus light from the light-emitting lamps 111 on the display surface of the LCD panel, thereby maximizing an efficiency of the light output by the light-emitting lamps 111.

However, the aforementioned light-emitting lamps 111 have limitations in divisional driving of the LCD device. In divisional driving of the LCD device, the entire display area is divided into several different areas, the light of the back light is increased in a display area for bright images and decreases in a display area for dark images to obtain dynamic display performance. In this case, instead of using the straight direct type light-emitting lamps of FIG. 1, U shaped lamps 211 are used, as shown in FIG. 2 to improve the efficiency of the lighting.

FIG. 2 illustrates a structure of the display area divided into eight areas. The U shaped lamps 211, as shown in FIG. 2 and FIG. 3, are provided with a phosphor 205 coated on an inner wall of a U shaped glass tube. A discharge gas of inert gas or Hg is injected into the U shaped lamps 211 and then both ends of each lamp 211 are sealed. Electrodes 208 are respectively arranged at both ends of the glass tube. A power source lead-in 209 is connected to the electrodes 208 to transfer a power source for driving the lamps. The power source lead-in 209 is coupled to an inverter 206 after being connected with a connector 207.

As illustrated in FIG. 2, the respective U shaped lamps 211 are symmetrical to each other so that their curves are positioned at the center. In this case, the light at the center may be brighter or darker depending on the distance between the facing curves of the U shaped lamps.

If the distance between the facing U shaped lamps is long, as shown in FIG. 4, a dark line A such as a dark stripe occurs at the center of the display area. For this reason, uniform light distribution is not obtained. Conversely, if the distance between the facing U shaped lamps is short, a bright line occurs at the center of the display area.

As described above, when the U shaped lamps are arranged to be symmetrical to each other to divisionally drive the LCD device, a dark line or a bright line can occur at the center of the display area, which deteriorates a picture quality of the display device.

SUMMARY OF THE INVENTION

Accordingly, the present invention is directed to a direct type back light that substantially obviates one or more problems due to the limitations and disadvantages of the related art.

An object of the present invention is to provide a direct type back light in which curves of a plurality of U shaped lamps are arranged at the center of a display area to face each other and a luminance control sheet is additionally provided below the curves to remove a bright line or a dark line occurring at the center of the display area, thereby improving a picture quality of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a direct type back light according to the present invention includes a plurality of lamps having at least one or more curves arranged to face each other, a luminance control sheet arranged beneath the curves of one or more lamps of the plurality of lamps, optical sheets arranged above the plurality of lamps, a reflecting plate arranged below the plurality of lamps, and a case receiving and fixing the above elements.

In other words, the direct type back light of the present invention is characterized in that curves of a plurality of U shaped lamps are arranged at the center of a display area to face each other and a luminance control sheet is additionally provided below the curves.

A reflecting sheet or an absorbing sheet is used as the luminance control sheet depending on the distance between the curves of the facing U shaped lamps. Specifically, if a dark line occurs between the curves because the distance between the curves of the facing lamps is long, a reflecting sheet is provided to make the light in the center area appear brighter. Conversely, if a bright line occurs between the curves because the distance between the curves of the facing lamps is short, an absorbing sheet is provided to make the center area appear darker. Thus, it is possible to improve light uniformity across the entire viewable area of the display, particularly in the central area of the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 5:
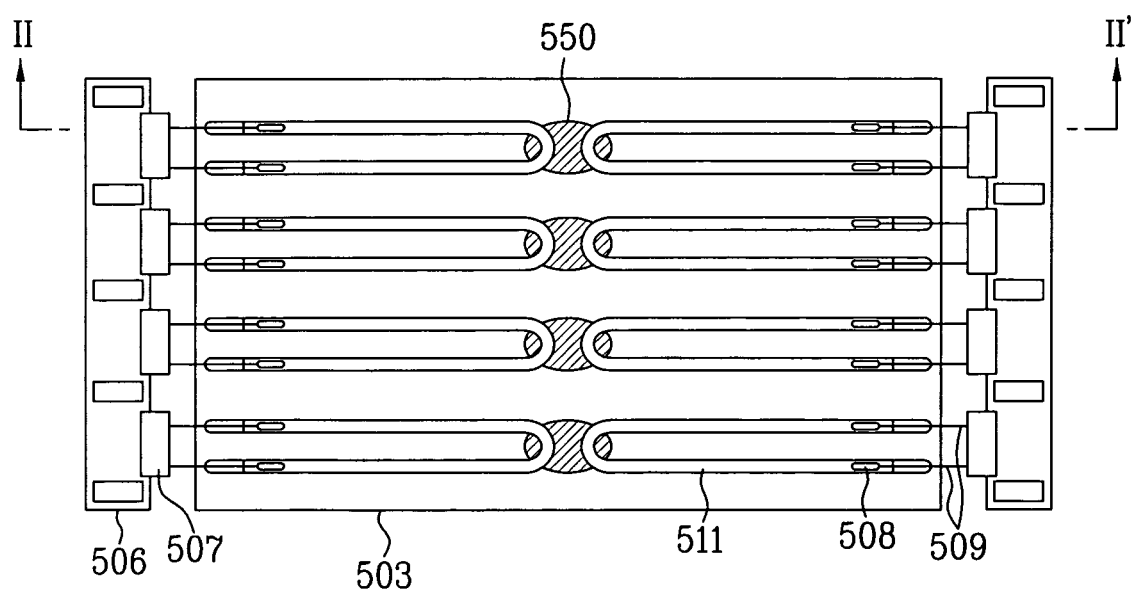
FIG. 5 is a plane view illustrating a direct type back light, according to the present invention.
Figure 6:
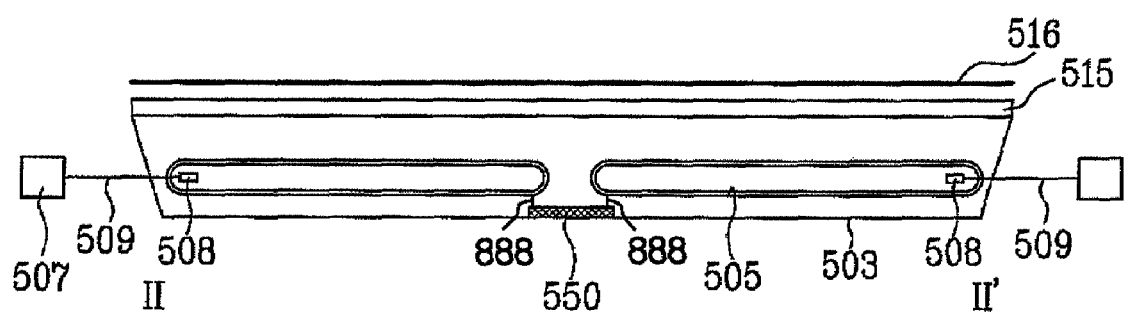
FIG. 6 is a sectional view taken along line II-II' of FIG. 5.
Figure 7:
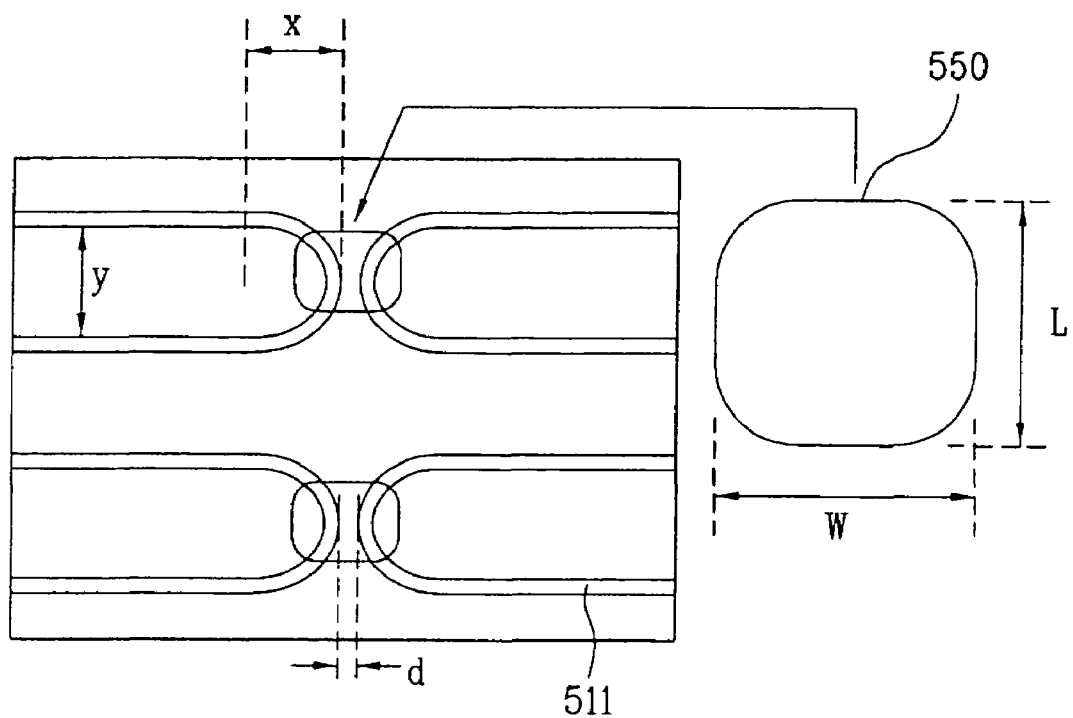
FIG. 7 is a detailed view illustrating a direct type back light according to the present invention.

FIG. 5 is a plane view illustrating a direct type back light according to the present invention, FIG. 6 is a sectional view taken along line II-II' of FIG. 5, and FIG. 7 is a detailed view illustrating a direct type back light according to the present invention.

The direct type back light according to the present invention, as shown in FIG. 5 and FIG. 6, includes U shaped lamps 511 of which curves are arranged along a center line of a display area to face each other with a gap therebetween to provide light. A reflecting plate (upper surface of element 503) is arranged below the U shaped lamps 511 to upwardly reflect light, which was downwardly emitted from the U shaped lamps. A diffusion sheet 515 is arranged above the U shaped lamps 511 to uniformly diffuse the light emitted from the U shaped lamps. A prism sheet 516 is arranged on the diffusion sheet 515 to focus the light diffused by the diffusion sheet 515 and transfer the focused light to the upper portion. Lastly, a luminance control sheet 550 is arranged on the reflecting plate between the curves of the U shaped lamps 511, e.g., in the vicinity of the gaps.

Each of the U shaped lamps 511 includes a U shaped transparent tube. An electrode 508 is formed at each end of the transparent tube and constitutes a cathode and an anode. A power source lead-in 509 applies a voltage to the electrode 508 and is soldered to the cathode and the anode, respectively, to drive the lamps. A phosphor 505 is coated on an inner wall of the transparent tube. The transparent tube is filled with a discharge gas such as Ne, Ar, and/or Hg and both ends of the transparent tube are sealed to prevent the gas from escaping. The power source lead-in 509 is connected to a connector 507, which is coupled to an inverter 506.

The U shaped lamps 511 may be arranged symmetrically or asymmetrically about the center line of the reflecting plate, where the luminance control sheets are provided.

The direct type back light may further include a protective sheet arranged on the prism sheet 516 to protect the prism sheet 516. Generally, the diffusion sheet, the prism sheet, and the protective sheet are referred to as optical sheets.

The optical sheets diffuse and disperse the light of the lamps in an attempt to prevent an outline or image of the lamps from being seen on a display surface of an LCD panel. Hence, the optical sheets assist in providing a light source having uniform brightness distribution across the entire display area.

The above elements of the direct type back light are received and fixed in a case 503. The direct type back light constructed as above is arranged below the LCD panel to provide plane light of uniform luminance to the LCD panel.

In accordance with the present invention, the back light additionally includes a luminance control sheet 550, beneath the curves of the lamps, to prevent bright line(s) or dark line(s) from occurring in the vicinity of the curves of the U shaped lamps. An absorbing ratio or a reflecting ratio of the luminance control sheet is selected to improve light uniformity of the entire LCD panel. In other words, if a dark line occurs at the center of the display area, a reflecting sheet (having a reflective property greater than the reflective property of the reflecting plate) is used as the luminance control sheet. If a bright line occurs at the center of the display area, an absorbing sheet (having a reflective property less than the reflective property of the reflecting plate) is used as the luminance control sheet.

The luminance control sheet 550 may have various shapes such as a circular shape, an oval shape, a square shape and a rectangular shape. Further, the luminance control sheet 550 may be attached to the reflecting plate by an adhesive, such as glue, or a double-sided tape, or the luminance control sheet could be applied as a layer, sprayed onto the reflecting plate. Alternatively, the luminance control sheets could be suspended from the lamp curves by hangers 888.

The size of the luminance control sheet 550 is selected depending on the distance between the curves of the U shaped lamps. This is because the light at the center of the display area may be brighter or darker depending on the distance between the curves of the U shaped lamps.

As shown in FIG. 7, a curvature radius of the curves of the U shaped lamps 511 is x, the shortest distance between straight lines of the lamps is y, and the distance between the curves of the facing lamps is d. In one embodiment of the invention, using these parameters, the luminance control sheet has dimensions wherein a width W of the luminance control sheet 550 fulfills a formula of W=2x+2d, and length of the luminance control sheet fulfills a formula of L=y.

Since a grey level is lowered by the dark line, such as a dark stripe occurring at the center of the display area, if the distance d between the curves of the facing lamps is long, the luminance control sheet is made of a material having good reflectivity (i.e. greater reflectivity than the underlying reflecting plate to which the luminance control sheet is adhered to or suspended above). Since the grey level is increased by the bright line, occurring at the center of the display area, if the distance d between the curves of the facing lamps is short, the luminance control sheet is made of a material having a good absorbing effect (i.e. less reflectivity than the underlying reflecting plate to which the luminance control sheet is adhered to or suspended above).

As described above, if the luminance control sheet is provided below the curves of the facing lamps, a dark line or a bright line occurring at the curves of the U shaped lamps is reduced or eliminated to obtain a display having an improved uniform luminance.

A luminance control sheet may be provided beneath a single set of adjacent curves or beneath several sets of adjacent curves to properly control luminance.

Figure 1:
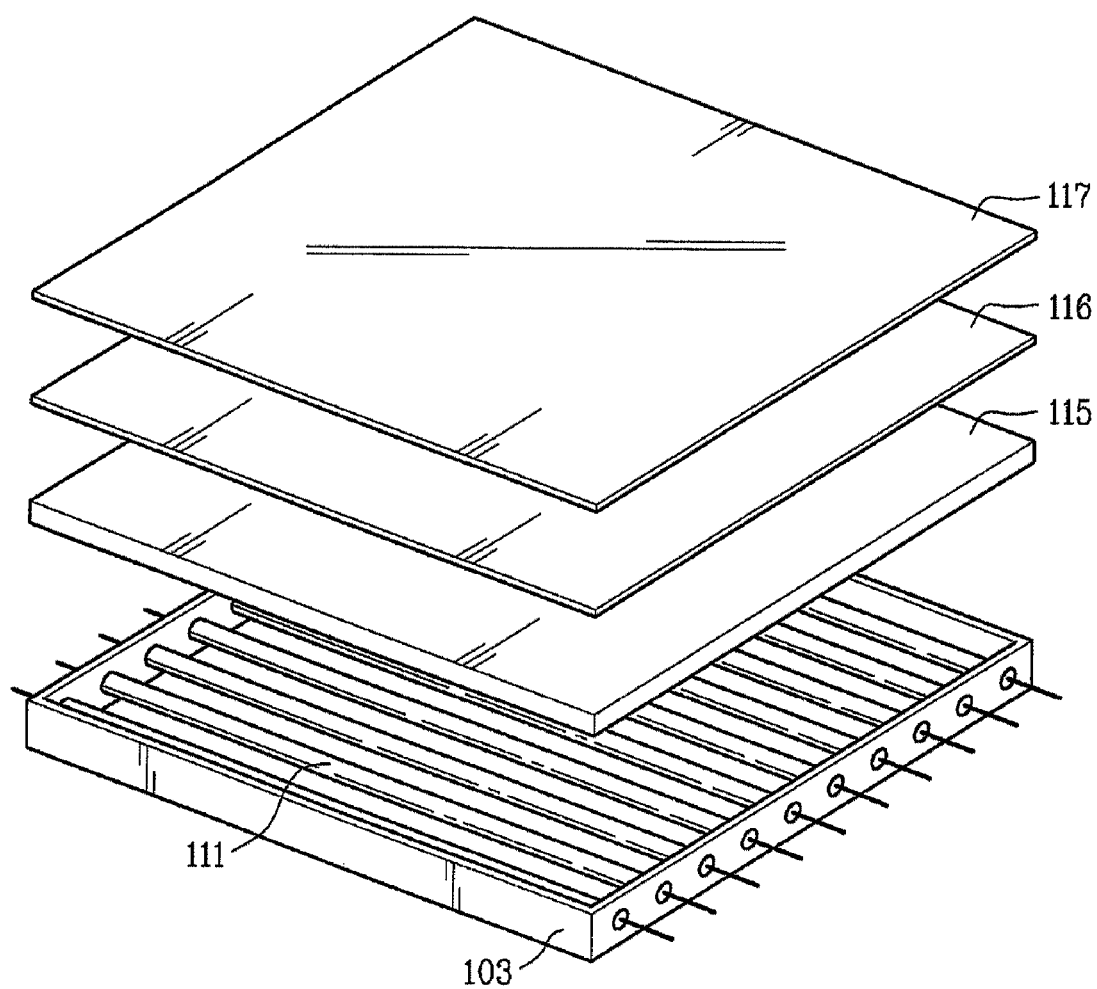
FIG. 1 is a perspective view illustrating a related art direct type back light.
Figure 2:
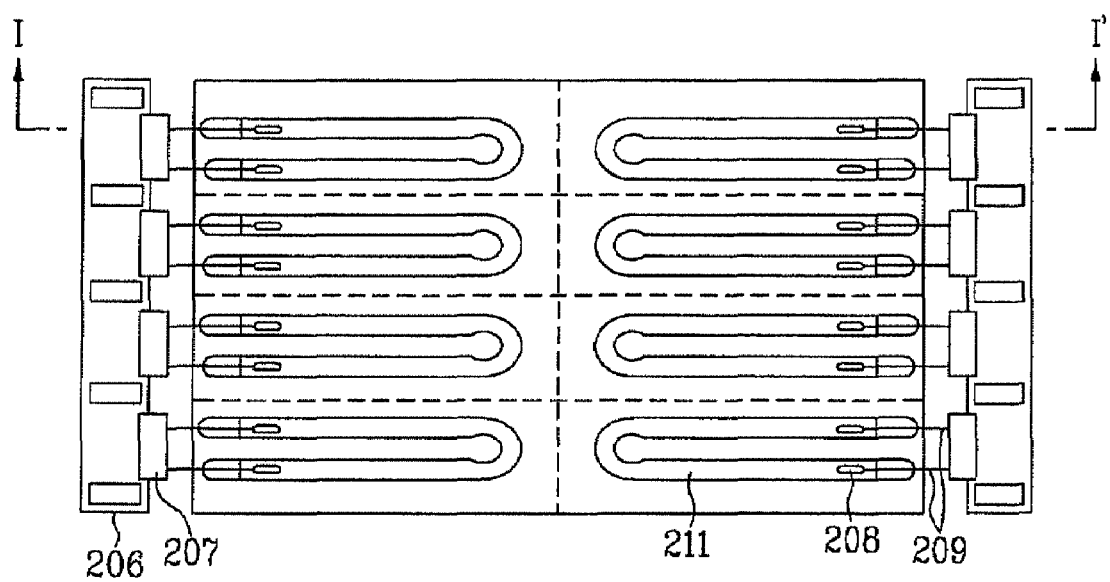
FIG. 2 is a plane view illustrating another related art direct type back light.
Figure 3:
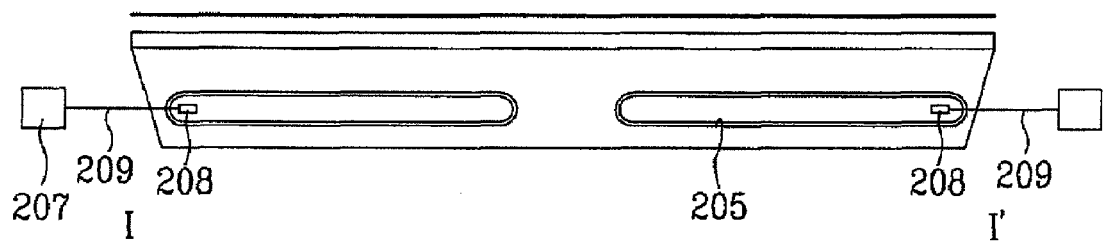
FIG. 3 is a sectional view taken along line I-I' of FIG. 2.
Figure 4:
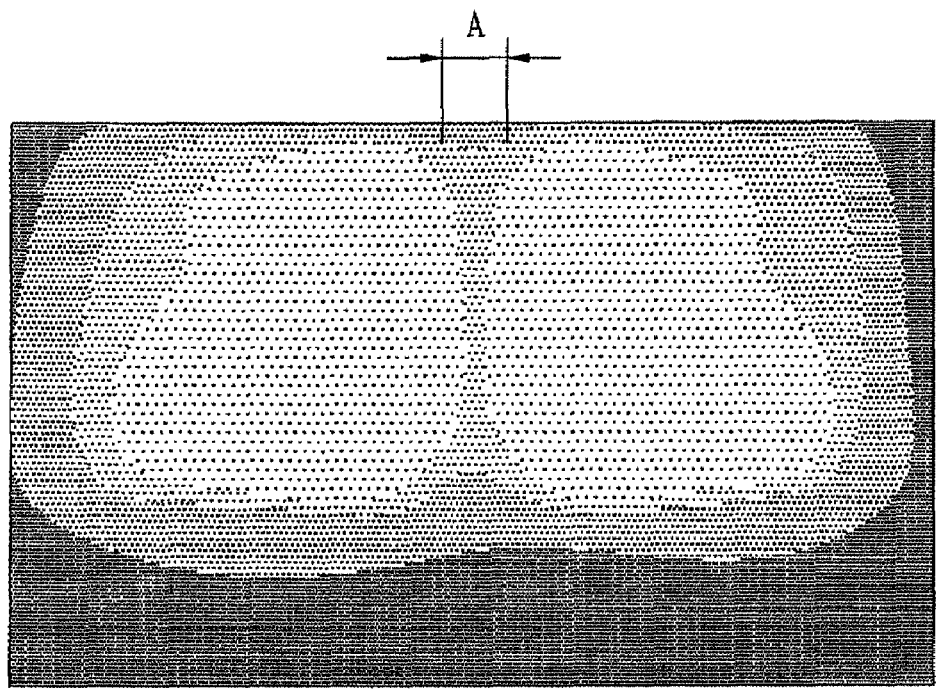
FIG. 4 is a photograph illustrating problems of the related art direct type back lights.

In addition to the U shaped lamps, ' ⊏ ' shaped lamps may be used in the present invention. In other words, the curved portion at the ends of the lamps may be more squared in shape. Also, the luminance control sheets could be placed in a space between two linear lamps (of the type illustrated in FIG. 1), if the lamps extended only approximately half way across the display.

As described above, the direct type back light according to the present invention has the following advantages.

Since the curves of the U shaped lamps are arranged at the center of the display area to face each other and the luminance control sheet is additionally provided below the curves, it is possible to remove a bright line or a dark line occurring at the center of the display area, thereby obtaining uniform luminance of the LCD panel and improving a picture quality of the device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A direct type back light comprising:
   a case;
   a plurality of lamps fixed inside said case, including at least two pairs of said lamps, wherein a first lamp of each pair of said lamps extends part away from proximate one side of said case toward an opposite side of said case and, after a gap, a second lamp of each pair of said lamps extends on toward the opposite side of said case;
   a reflecting plate arranged below said plurality of lamps; and
   a luminance control sheet located above said reflecting plate and below said plurality of lamps in an area of said gap,
   wherein said luminance control sheet has a reflective property which is different than a reflective property of said reflecting plate,
   wherein said luminance control sheet is separated from an adjacent luminance control sheet and is formed beneath each of curved portions of said lamps,
   wherein said at least one luminance control sheet has a width W and a length L to respectively fulfill the formulas of W=2x+2d and L=y where x is an outer curvature radius of a curve of a lamp of said plurality of lamps, y is a shortest distance between straight segments of said lamp, and d is a distance between curves of facing lamps, and
   wherein said at least one luminance control sheet is suspended from the lamp curve by a hanger.

2. The direct type back light as claimed in claim 1, wherein said luminance control sheet has a reflective property which is less than a reflective property of said reflecting plate.

3. The direct type back light as claimed in claim 1, wherein said luminance control sheet has a reflective property which is greater than a reflective property of said reflecting plate.

4. The direct type back light as claimed in claim 1, wherein said luminance control sheet has a circular shape, an oval shape, a square shape or a rectangular shape.

5. The direct type back light as claimed in claim 1, wherein said luminance control sheet is attached to or integral with said reflecting plate.

6. The direct type back light as claimed in claim 5, wherein said luminance control sheet is attached to said reflecting plate by an adhesive.

7. The direct type back light as claimed in claim 1, further comprising:
   at least one optical sheet to diffuse and/or disperse light emitted by said plurality of lamps, said at least one optical sheet being disposed above said plurality of lamps.

8. The direct type back light as claimed in claim 1, wherein said gap is located along a centerline of said reflecting plate.

9. The direct type back light as claimed in claim 1, wherein each of said plurality of lamps has a 'U' shape.

10. A direct type back light comprising:
    a case;
    a plurality of curved lamps fixed inside said case including at least two pairs of said curved lamps, wherein ends of said curved lamps of each pair reside proximate a side of said case and the curved portions of said lamps face to each other, with a gap residing between the facing curved portions of pairs of said lamps;

a reflecting plate arranged below said plurality of lamps; and at least one luminance control sheet located above said reflecting plate and below said plurality of lamps in respective areas of said gap, wherein said luminance control sheet has a reflective property which is different than a reflective property of said reflecting plate, wherein said luminance control sheet is separated from an adjacent luminance control sheet and is formed beneath each of the curved portions of said lamps, wherein said at least one luminance control sheet has a width W and a length L to respectively fulfill the formulas of $W=2x+2d$ and $L=y$, where x is an outer curvature radius of a curve of a lamp of said plurality of lamps, y is a shortest distance between straight segments of said lamp, and d is a distance between curves of facing lamps, and wherein said at least one luminance control sheet is suspended from the lamp curve by a hanger.

11. The direct type back light as claimed in claim 10, wherein said luminance control sheet has a reflective property which is less than a reflective property of said reflecting plate.

12. The direct type back light as claimed in claim 10, wherein said luminance control sheet has a reflective property which is greater than a reflective property of said reflecting plate.

13. The direct type back light as claimed in claim 10, wherein said at least one luminance control sheet has a circular shape, an oval shape, a square shape or a rectangular shape.

14. The direct type back light as claimed in claim 10, wherein said at least one luminance control sheet is attached to or integral with said reflecting plate.

15. The direct type back light as claimed in claim 14, wherein said at least one luminance control sheet is attached to said reflecting plate by an adhesive.

16. The direct type back light as claimed in claim 10, further comprising:

at least one optical sheet to diffuse and/or disperse light emitted by said plurality of lamps, said at least one optical sheet being disposed above said plurality of lamps.

17. The direct type back light as claimed in claim 10, wherein said gaps are located along a center line of said reflecting plate.

18. The direct type back light as claimed in claim 10, wherein said luminance control sheet made of a material having a higher or lower reflective property than said reflecting plate depending on the length of the distance d.

* * * * *